June 14, 1960     F. VON BOMHARD     2,940,559
CLUTCH REENGAGEMENT CONTROL DEVICE
Filed Jan. 14, 1957
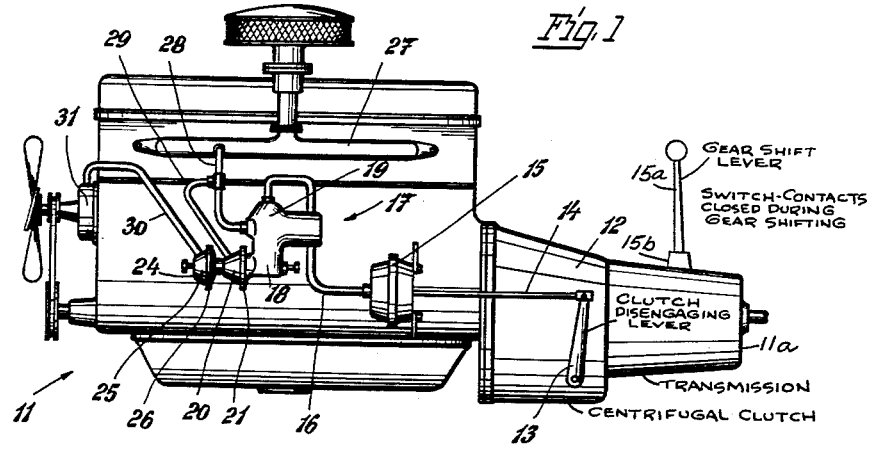
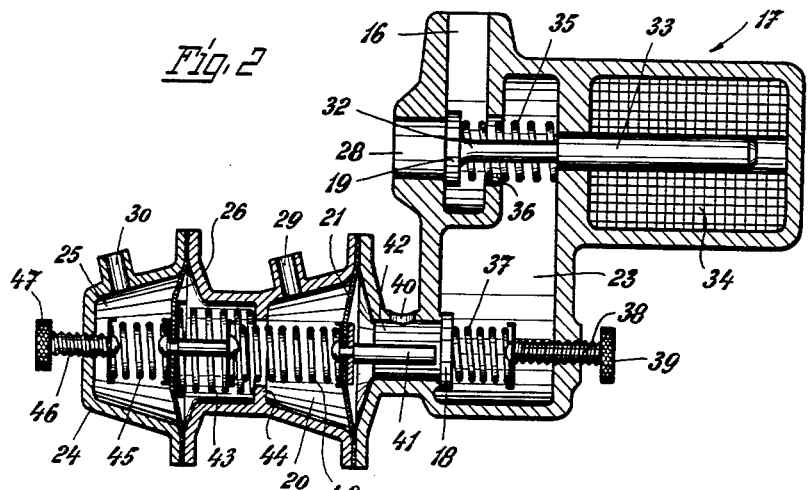
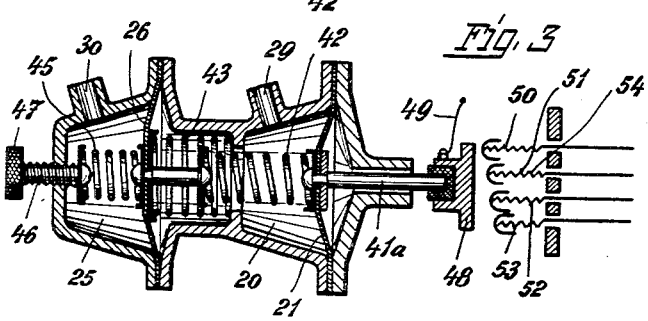
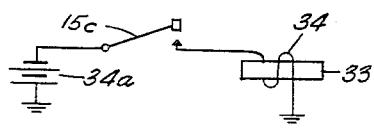
INVENTOR
FRANZ von BOMHARD
BY
Richardson, David and Nordon
ATTORNEYS.

United States Patent Office 2,940,559
Patented June 14, 1960

2,940,559
CLUTCH REENGAGEMENT CONTROL DEVICE

Franz von Bomhard, Schweinfurt, Germany, assignor to Fichtel & Sachs A.G., Schweinfurt am Main, Germany, a corporation of Germany Filed Jan. 14, 1957, Ser. No. 634,108

Claims priority, application Germany Feb. 17, 1956

11 Claims. (Cl. 192—.075)

The present invention relates to a mechanism for control of the engaging operation of automatic clutches. More particularly, it relates to novel devices for control of the engagement of automatically actuated clutches of internal combustion engines in a step-wise manner so as to avoid uneven acceleration.

In an earlier application, U.S. Patent application Serial No. 536,929, filed September 27, 1955, and now abandoned, there has been described a control device for an automatic clutch in which the amount of the coupling torque transmitted is dependent upon the degree of vacuum prevailing in the suction line of the internal combustion engine. The device operates on the principle that if the clutch is engaged following completion of gear shifting with the throttle valve closed, i.e., with the motor braked, the coupling torque will be limited due to an only partical elimination of the clutch disengaging force. In the case of an electromagnetically controlled clutch this will be achieved by a partial reduction in the current intensity. This limitation of the coupling torque can be gradually eliminated to permit transmission of full torque in the further course of engagement of the clutch by compressed air, suction, oil pressure, or the like, or it can be maintained constant in the case of electromagnetically controlled clutches.

If the throttle valve is opened immediately following gear shifting to increase the speed of the motor and thus the motor torque, the clutch will not be able to transmit the increased torque and will slip due to the limitation of the coupling torque. In order to prevent this, the increased pressure (still below atmospheric) prevailing in the suction line due to opening of the throttle valve can be used to speed up elimination of the clutch disengaging force either through a control valve or by disconnection of resistors in the case of an electromagnitically controlled clutch.

This control method wherein the coupling torque is dependent upon the suction prevailing in the suction line has the disadvantage that when gas is fed rapidly directly after shifting to a low gear, the clutch will not engage smoothly and a jerk or jolt will be felt. This is due to the fact that when the throttle valve is opened rapidly, particularly at low motor speeds, the pressure within the suction line is relatively high whereas a certain amount of time is necessary before the rotational speed of the motor is increased. The instantaneous reduction of the vacuum results in a forceful engagement of the clutch while the motor is still braking, followed by a rapid acceleration of the motor.

It is accordingly an object of the present invention to provide a control device which permits smooth clutch engagement even when gas is fed rapidly directly following completion of gear shifting.

It is a further object of the invention to provide a control device whereby the coupling torque is for the most part controlled in dependence upon the pressure prevailing in the suction line but is additionally modified and controlled in part by the actual engine speed.

Still another object of the invention is to provide a control device wherein at low speeds the coupling torque is controlled by the engine speed to ensure smooth acceleration while at higher speeds the coupling torque is controlled by the pressure in the suction line.

In accordance with the present invention, devices such as those heretofore employed for suction line control of the coupling torque are modified in such manner that they do not become operative until the rotational speed of the engine has reached a predetermined minimum value beyond that speed at which the engine exerts a retarding action. In this manner acceleration is smooth and is not accompanied by a jolt when gas is fed suddenly. For the initial control phase, any force which varies with the rotational speed of the engine can be utilized, such as a separate centrifugal governor, the pressure of the lubricating oil or the cooling fluid, or the like. The novel structure is applicable to mechanically controlled clutches as well as to electromagnetically controlled clutches.

The invention will now be described more fully with reference to the accompanying drawing, wherein:

Fig. 1 is a lateral elevation of an automobile engine having the novel control device of the present invention incorporated therein;

Fig. 2 is a sectional view of a portion of the control mechanism of Fig. 1;

Fig. 3 is a sectional view of a portion of a further embodiment of a control device designed for use with an electromagnetically controlled clutch; and Fig. 4 is an electrical circuit diagram showing an energizing circuit for the operating winding of a solenoid illustrated in Fig. 2.

Referring now more particularly to the drawing, in Fig. 1 there is shown an internal combustion engine designated generally as 11 which is coupled through a transmission 11a in conventional manner with a load such as the traction wheels of a vehicle (not shown) by means of a centrifugal clutch 12. Actuation of the clutch is controlled by a disengaging lever 13 which at its upper end is pivotally connected with a linkage or tie-rod 14 extending into the suction cylinder of a pneumatic servomotor 15. The transmission 11a is provided with a gear shift lever 15a for changing the gear ratio provided by the conventional gearing within the transmission 11a. Operatively associated with the gear shift lever 15a is an electric switch 15b. The switch 15b includes contacts 15c (Fig. 4) which are normally open. The switch contacts 15c are closed during gear shifting movement of the gear shift lever 15a and open when the gear shift lever is disposed in any final driving position. Contacts 15c are also open when the gear shift lever 15a is in its neutral position.

A duct or line 16 leads from the servomotor 15 to a housing 17 which contains a reduction valve 18 and a control valve 19. Adjacent the reduction valve 18, the housing 17 includes a chamber 20 and a pressure responsive element such as a diaphragm 21 separating the chamber 20 from the remainder of the housing, viz., zone 22 and space 23 (Fig. 2). A further housing 24 defines a chamber 25 which is separated from chamber 20 by a diaphragm 26. The space 23 of housing 17 is in communication with the suction line 27 of the engine by means of pipe 28 which enters the housing 17 adjacent valve 19. A branch 29 of pipe 28 is connected with chamber 20 so that the latter is also in communication with the suction line 27. A pipe 30 connects chamber 25 with the water pump 31 of the engine, the pressure of the pump depending upon the rotational speed of the engine 11.

In Fig. 2 housing 17 and its associated elements are shown on an enlarged scale in a position in which the clutch is fully engaged. Within housing 17 the valve 19 is provided with an elongated stem 32, the enlarged end 33 of which functions as a core for the solenoid winding 34. The solenoid winding 34 is energized from a battery 34a (Fig. 4) through the switch contacts 15c. A compression spring 35 supported by the inner wall of space 23 surrounds the stem 32 and bears against the head of valve 19, thereby urging it toward the left into a position wherein it closes off pipe 28 from communication with line 16. It will be noted that stem 32 extends through an aperture 36 which affords communication between line 16 and pressure restoration space 23. The aperture 36 is of such diameter that it is completely closed off by the head of valve 19 when the core 33 is withdrawn to the right by solenoid winding 34.

The reduction valve 18 is urged to the left in Fig. 2 by a spring 37 acting on one side thereof, the force of said spring being adjustable by means of screw 38 provided with a manipulating head 39 extending outwardly from space 23. The zone 22, which is in communication with the atmosphere through port 40, is located on the other side of valve 18 and is separated from chamber 20 to the left by diaphragm 21. Diaphragm 21 is provided with a projection or rod 41 extending into zone 22.

Within chamber 20 a spring 42 bears against diaphragm 21 at the right and at its left end is effectively in contact with diaphragm 26. A further spring 43 also is in contact with diaphragm 26 but at its right bears against a shoulder or abutment 44 in chamber 20. The position of diaphragm 26 is itself determined by a spring 45 in chamber 25 which is tensioned to a predetermined extent by set screw 46 carrying manipulating knob 47. In the position of the elements shown in Fig. 2, diaphragm 21 is so far to the left as a result of the combined actions of the pressure of the water pump exerted on diaphragm 26 through pipe 30 and of the suction line 27 exerted on both diaphragms through branch 29 that rod 41 does not contact valve 18.

The apparatus functions in the following manner:

Upon actuation of the gear shift lever 15a to initiate a change in gears the solenoid winding 34 is energized through the switch contacts 15c from battery 34a. The core 33 and stem 32 are displaced to the right so that valve 19 closes off aperture 36 and establishes communication between pipe 28 and line 16 so that the latter is subjected to the vacuum in the suction line 27. The servomotor 15 is thus actuated to pull linkage 14 to the left, pivoting lever 13 in counter-clockwise direction and disengaging the clutch 12.

When the gear shifting operation is completed solenoid winding 34 is deenergized and valve 19 returns to the position shown in Fig. 2 wherein line 16 is in communication with space 23 through aperture 36. The ensuing pressure drop in space 23 causes opening of the pressure regulating valve 18 between the space 23 and the zone 22 which is in communication with the atmosphere through port 40. Valve 18 remains open until the pressure differential determined by the compression spring 37 is attained. The attained pressure in space 23 and line 16 being higher than that previously in line 16, the linkage 14 of servomotor 15 is now displaced to the right and thus the clutch is partially engaged to transfer a low torque.

If gas is fed in large amounts, the pressure in the suction line 27 will be increased (the suction will be diminished) and as a result the absolute pressure within chamber 20 will also increase. The increased pressure has no effect on valve 19 which is maintained by its spring 35 in its position closing off pipe 28. The balance of springs 42 and 43 within chamber 20 is such that the increased pressure effects substantially no change in the positions of the diaphragms 21 and 26. As more gas is fed, the motor speed increases together with the water pressure in chamber 25 thereby displacing diaphragm 26 to the right. Diaphragm 21 is also displaced to the right aided by the reduced suction in chamber 20, carrying projection 41 toward valve 18. When the speed of the motor increases beyond the minimum determined roughly by the characteristic of spring 43 and precisely by the screws 38 and 46, valve 18 will be opened. The partial vacuum prevailing in the servomotor 15, line 16 and space 23 will thus be eliminated due to communication with the atmosphere through aperture 40 and the clutch will become fully engaged.

It can be seen that even if gas is fed rapidly so that the suction in chamber 20 is diminished rapidly the complete reengagement of the clutch will not be sudden and jerky. Rather, it will first be necessary for the motor speed to increase sufficiently to allow the full transmission of power and a smooth clutch engagement will result.

Where the cooling water circulating pump serves as the reservoir for the fluid of which the pressure is dependent upon the engine's rotational speed, either a simple cooling system or a pressurized system can be employed. The screw settings can compensate for the pressure so that the controlling feature will be the pressure differential between the pump inlet and outlet. Compensation can also be made for pressure differences due to differences in temperature.

Fig. 3 relates to a modified mechanism suitable for controlling an electromagnetically actuated clutch, as opposed to the pneumatically actuated clutch of Figs. 1 and 2. In Fig. 3, the projection or rod 41a on the diaphragm 21 is provided with an insulated contact member 48 carrying lead 49. Contacts 50, 51, 52 and 53 are urged by respective springs 54 to staggered position relative to contact member 48. When contact 48 advances to the right through movement of diaphragm 21 in the manner previously described, the control circuit is successively established through contacts 50 through 53 thereby sequentially shunting out, according to an exactly selectable characteristic, series resistors (not shown) either directly or through a relay so as to increase the transferable coupling torque in the desired manner.

Various changes and modifications may be made without departing from the spirit and scope of the present invention and it is intended that such obvious changes and modifications be embraced by the annexed claims.

What is claimed is:

1. In an internal combustion engine fed with fuel over a suction line, and provided with a clutch, gear shift mechanism means for automatically actuating said clutch, and operative connecting means responsive to engine suction and interposed between said clutch and said suction line so that upon engagement of said clutch the torque transmitted thereby is dependent upon the vacuum prevailing in said suction line, the improvement which comprises means operative upon actuation of the gear shift mechanism to disengage the clutch, means dependent upon the speed of rotation of said engine and controlling said operative connecting means, whereby control of the transmitted torque as a function of the pressure in said suction line commences only after the engine has attained a predetermined minimum speed.

2. An engine as defined in claim 1, including a housing connected to a portion of said operative connecting means, a diaphragm separating said portion of said operative connecting means from said housing and defining with the latter a chamber, a reservoir of pressure fluid, and pipe means connecting said chamber with said reservoir, the pressure on said fluid being dependent upon the rotational speed of said engine.

3. In a self-propelled vehicle powered by an internal combustion engine fed with fuel over a suction line; a clutch for driving said vehicle from said engine, operator-controlled means for partially engaging said clutch, means for automatically completing engagement of said clutch, a housing defining a chamber, duct means providing communication between said chamber and said suction line, a pressure responsive diaphragm in said chamber arranged for displacement therein in dependence upon the pressure prevailing within said chamber and said suction line, said diaphragm being operatively connected with said means for completing engagement of said clutch, and a displaceable member operatively connected with said engine and said pressure responsive element, displacement of said displaceable member being dependent upon the rotational speed of said engine, whereby after partially engaging said clutch feeding of fuel to said engine causes the engine speed to increase so that after said displaceable member has been displaced by a predetermined amount of feeding of fuel causes said pressure responsive element to be displaced as a result of the increased pressure prevailing in said suction line, to thereby actuate said means for completing engagement of said clutch.

4. A vehicle as defined in claim 3, including a servomotor unit controlling engagement of said clutch, normally closed valve means serving to maintain said servomotor unit under reduced pressure following completion of a gear shifting operation so that transmission of torque by said clutch is limited, and valve opening means carried by said pressure responsive element, whereby displacement of said pressure response element with said valve opening means increases the pressure within said servomotor unit to permit full torque transmission.

5. A vehicle as defined in claim 3, including first contact means operatively connected with said pressure responsive means and displaced therewith, electromagnetic means controlling engagement of said clutch, and a plurality of second contact means operatively connected with said controlling said electromagnetic means, displacement of said pressure responsive means together with said first contact means effecting electrical connection between said first contact means and at least one of said second contact means.

6. In combination, an internal combustion engine having a fuel intake, a clutch, gear shift mechanism and clutch control mechanism arranged to release the clutch when the gear shift mechanism is operated, means responsive to the acceleration of the engine to partially engage the clutch, and means responsive to further acceleration of the engine and to pressure caused by the engine acceleration to fully engage the clutch.

7. In combination, an internal combustion engine having a suction intake, a clutch, and gear shift mechanism, means interposed between the suction intake and the clutch and set in operation when the gear shift is operated to shift gears for disconnecting the clutch, said means including means responsive to the acceleration of the engine to partially engage the clutch, and means responsive to further engine acceleration and to increased pressure caused thereby to fully engage the clutch.

8. In combination, an internal combustion engine having a suction intake, a clutch, and gear shift mechanism, means interposed between the suction intake and the clutch and set in operation when the gear shift is operated to shift gears for disconnecting the clutch, said means including means responsive to the acceleration of the engine to partially engage the clutch, and means responsive to further engine acceleration and to increased pressure caused thereby to fully engage the clutch, said last named means including pressure controlled diaphragms responsive to engine suction and pressure.

9. In combination, an internal combustion engine having a suction intake, a clutch, and gear shift mechanism, means interposed between the suction intake and the clutch and set in operation when the gear shift is operated to shift gears for disconnecting the clutch, said means including means responsive to the acceleration of the engine to partially engage the clutch, and means responsive to further engine acceleration and to increased pressure caused thereby to fully engage the clutch, said last named means including pressure controlled diaphragms responsive to engine suction and pressure arranged in tandem in connected chambers.

10. In combination, an internal combustion engine having a fuel intake, a clutch, gear shift mechanism, and clutch control mechanism arranged to release the clutch when the gear shift mechanism is operated, means responsive to engine suction to partially engage the clutch upon acceleration of the engine, and means responsive to further engine acceleration and pressure created by the engine for fully engaging the clutch.

11. In combination, an internal combustion engine having a fuel intake, a clutch, gear shift mechanism, and clutch control mechanism arranged to release the clutch when the gear shift mechanism is operated, means responsive to engine suction to partially engage the clutch upon acceleration of the engine, and means responsive to further engine acceleration and pressure created by the engine and including suction and pressure responsive diaphragms for fully engaging the clutch.

References Cited in the file of this patent

UNITED STATES PATENTS

| | | |
|---|---|---|
| 2,144,034 | Sanford | Jan. 17, 1939 |
| 2,589,628 | Price | Mar. 18, 1952 |
| 2,605,873 | Prother | Aug. 5, 1952 |